United States Patent
Fukuda et al.

(10) Patent No.: US 12,030,783 B2
(45) Date of Patent: Jul. 9, 2024

(54) METHOD FOR PRODUCING CORE-SHELL POROUS SILICA PARTICLES

(71) Applicants: TOHOKU UNIVERSITY, Sendai (JP); DAICEL CORPORATION, Osaka (JP)

(72) Inventors: Daisuke Fukuda, Tokyo (JP); Daisuke Nagao, Sendai (JP); Haruyuki Ishii, Sendai (JP); Shunho Ishikawa, Sendai (JP)

(73) Assignees: TOHOKU UNIVERSITY, Sendai (JP); DAICEL CORPORATION, Osaka (JP)

( * ) Notice: Subject to any disclaimer, the term of this patent is extended or adjusted under 35 U.S.C. 154(b) by 608 days.

(21) Appl. No.: 17/271,704

(22) PCT Filed: Aug. 13, 2019

(86) PCT No.: PCT/JP2019/031828
§ 371 (c)(1),
(2) Date: Feb. 26, 2021

(87) PCT Pub. No.: WO2020/045077
PCT Pub. Date: Mar. 5, 2020

(65) Prior Publication Data
US 2021/0316997 A1    Oct. 14, 2021

(30) Foreign Application Priority Data
Aug. 28, 2018   (JP) .................... 2018-159597

(51) Int. Cl.
C01B 33/18    (2006.01)
B82Y 30/00    (2011.01)
B82Y 40/00    (2011.01)

(52) U.S. Cl.
CPC .............. C01B 33/18 (2013.01); *B82Y 30/00* (2013.01); *B82Y 40/00* (2013.01); *C01P 2004/04* (2013.01); *C01P 2004/32* (2013.01); *C01P 2004/62* (2013.01); *C01P 2004/82* (2013.01); *C01P 2006/12* (2013.01); *C01P 2006/14* (2013.01); *C01P 2006/16* (2013.01)

(58) Field of Classification Search
CPC ..................................................... C01B 33/18
See application file for complete search history.

(56) References Cited

U.S. PATENT DOCUMENTS

| | | |
|---|---|---|
| 3,505,785 A | 4/1970 | Kirkland |
| 2007/0189944 A1* | 8/2007 | Kirkland .............. B01J 20/3295 423/118.1 |
| 2009/0053524 A1 | 2/2009 | Yamada et al. |
| 2011/0226990 A1 | 9/2011 | Glennon et al. |
| 2013/0267629 A1 | 10/2013 | Fukuoka et al. |
| 2014/0159025 A1 | 6/2014 | Fukuoka et al. |
| 2020/0071171 A1* | 3/2020 | Konno ................ B01J 20/283 |

FOREIGN PATENT DOCUMENTS

| | | |
|---|---|---|
| CN | 104069839 B | 8/2016 |
| JP | 2012-509974 A | 4/2012 |
| JP | 2012-171833 A | 9/2012 |
| WO | WO 2007/122930 A1 | 11/2007 |
| WO | WO 2014/024379 A1 | 2/2014 |
| WO | WO 2017/141821 A1 | 8/2017 |
| WO | WO-2017141821 A1 * | 8/2017 .......... B01J 20/103 |

OTHER PUBLICATIONS

Extended European Search Report for European Application No. 19856368.6, dated Sep. 24, 2021.
Kim et al., "Synthesis of monodisperse silica spheres with solid core and mesoporous shell: Morphological control of mesopores", Colloids and Surfaces A: Physicochem. Eng. Aspects, vol. 313-314, Dec. 27, 2007, pp. 77-81.
English translation of International Preliminary Report on Patentability and Written Opinion mailed Mar. 11, 2021, in PCT/JP2019/031828.
English Translation of International Search Report dated Nov. 19, 2019, in PCT/JP2019/031828.
Zhang et al., "Synthesis and characterization of pore size-tunable magnetic mesoporous silica nanoparticles," Journal of Colloid and Interface Science (2011), vol. 361, pp. 16-24.

* cited by examiner

*Primary Examiner* — Yong L Chu
(74) *Attorney, Agent, or Firm* — Birch, Stewart, Kolasch & Birch, LLP

(57) ABSTRACT

An object of the present disclosure is to provide a method for producing a core-shell porous silica particle with an increased thickness of the shell. The object is met by a method for producing a core-shell porous silica particle, the method including the following steps: (a) preparing; (b) forming a shell precursor; (c) forming a shell; (d) preparing; (e) forming a shell precursor; and (f) forming a shell; wherein the steps (d) through (f) are further repeated one to three times, in which case the step of forming a shell described in step (d) refers to step (f).

7 Claims, 2 Drawing Sheets

METHOD FOR PRODUCING CORE-SHELL POROUS SILICA PARTICLES

TECHNICAL FIELD

The present disclosure relates to a production method for a core-shell porous silica particle.

BACKGROUND ART

Porous materials such as porous silica are widely used as adsorbents and catalysts due to their large specific surface areas, and it is expected that their use is expanded by forming such porous materials into particles. For example, mesoporous silica particles (MSP) having a pore size from approximately 2 to 50 nm can be used for drug delivery when the particle size is 100 nm, and can be used as fillers for liquid chromatography columns when the particles are of a micron size. In such cases, it is necessary for the particle size to be as uniform as possible, that is, for the particles to be a monodispersed system. Furthermore, in cases where porous silica is used as a filling material for liquid chromatography, it is necessary for the porous silica to have low liquid feeding resistance and high separation efficiency.

In order to reduce the liquid feeding resistance, the particle size of the porous silica may be increased. However, when the particle size of the porous silica is increased, it takes time for a substance to be separated, which are adsorbed by the porous silica and reach the center part of the porous silica, to be released from the porous silica, and thus separation efficiency decreases. On the other hand, if the particle size of the porous silica is reduced to increase the separation efficiency, the liquid feeding resistance increases.

In order to achieve both low liquid feeding resistance (suppression of pressure loss) and high separation efficiency, the use of core-shell type silica particles in which the surface of non-porous silica core particles are covered with a shell made from porous silica has been considered. Since the core-shell type silica particle has a non-porous silica core particle at the center, the substance to be separated, which is adsorbed by the core-shell type silica particle, remains in the shell near the surface. Thus, the time from the adsorption by the core-shell type silica particles until the release of the substance to be separated is short, and the separation efficiency is high. In addition, by increasing the size of the silica core particles, the particle size of the core-shell type silica particles can be increased while reducing the thickness of the shell, and thus liquid feeding resistance can be reduced without causing the separation efficiency to be decreased.

Various core-shell type silica particles have been developed so far (for example, see Patent Document 1 and Non-Patent Document 1). A core-shell type silica particle having high sphericity and a narrow particle size distribution and a method for producing the same have also been developed (Patent Document 2).

Furthermore, a method for producing core-shell porous silica particles having increased monodispersion and an increased peak pore size has also been developed (Patent Document 3). However, with regard to the particles formed by these methods, there is room for improvements such as further increasing the thickness of the shell.

Known technologies for increasing the thickness of the shell include, for example, a technology in which shell formation (coating), when using fine particles as the raw material of the shell, is repeated multiple times until a desired shell thickness is obtained (see Patent Document 4 and Patent Document 5).

CITATION LIST

Patent Document

Patent Document 1: JP 2012-171833 A
Patent Document 2: WO 2007/122930
Patent Document 3: WO 2017/141821
Patent Document 4: U.S. Pat. No. 3,505,785 A
Patent Document 5: US 2007/0189944 A

Non-Patent Document

Non-Patent Document 1: J. Zhang et al., Journal of Colloid and Interface Science, 361 (2011) 16-24

SUMMARY OF DISCLOSURE

Technical Problem

An object of the present disclosure is to provide a method for producing a core-shell porous silica particle with an increased thickness of the shell.

Solution to Problem

As a result of diligent research, the inventors of the present disclosure discovered that the problem described above can be solved by forming a porous shell on the surface of a non-porous silica particle in multiple stages, and thereby the inventors completed the present disclosure. The present disclosure is as follows.

<1> A production method for a core-shell porous silica particle, the method including: (a) preparing an aqueous solution containing a non-porous silica particle, a cationic surfactant, a basic catalyst, and an alcohol; (b) adding a silica source to the aqueous solution to form a shell precursor on a surface of the non-porous silica particle; (c) removing the cationic surfactant from the shell precursor and forming a porous shell; (d) preparing an aqueous solution containing the porous silica particle resulting from the shell formation, a cationic surfactant, a basic catalyst, and an alcohol; (e) adding a silica source to the aqueous solution and forming a shell precursor on a surface of the porous silica particle; and (f) removing the cationic surfactant from the shell precursor to form a porous shell; wherein the steps (d) to (f) are further repeated one to three times, in which case the "shell formation" in step (d) refers to the shell formation in step (f).

<2> The production method according to <1>, wherein the cationic surfactant is at least one selected from the group consisting of a hexadecyltrimethylammonium halide and an octadecyltrimethylammonium halide.

<3> The production method according to <1> or <2>, wherein the basic catalyst is ammonia.

<4> The production method according to any one of <1> to <3>, wherein the alcohol is ethanol.

<5> The production method according to any one of <1> to <4>, wherein the silica source is tetraethoxysilane.

Advantageous Effects of Disclosure

According to the present disclosure, a method for producing a core-shell porous silica particle with an increased thickness of the shell can be provided. Specifically, it is possible to obtain a core-shell porous silica particle having a shell that is sufficiently thicker than a shell in case of shell formation performed only once on the core particle. In addition, according to the present disclosure, a stable shell that does not easily disintegrate can be formed. Furthermore, a desired pore structure without drawbacks such as filled pores can be formed.

That is, according to the present disclosure, the core-shell porous silica particle having a stable shell whose thickness is sufficiently increased, which has a desired pore structure, and that does not easily disintegrate can be easily produced at a low cost in a short time.

DESCRIPTION OF EMBODIMENTS

Figure 1:
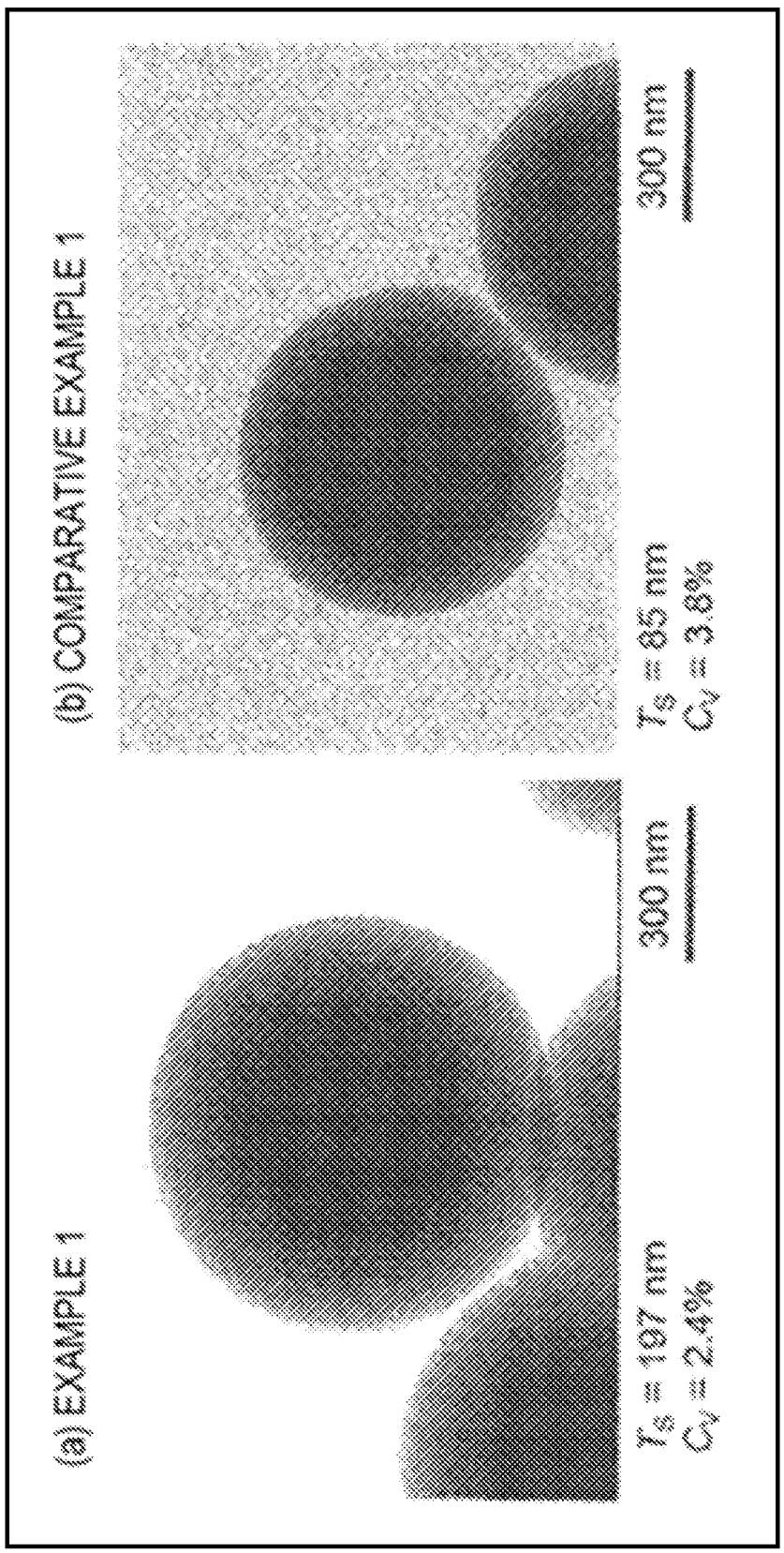
FIG. 1(a) is a scanning transmission electron microscope (STEM) image of particles obtained in Example 1 (a photograph in lieu of a drawing), while (b) is a scanning transmission electron microscope (STEM) image of particles obtained in Comparative Example 1 (a photograph in lieu of a drawing).

The present disclosure relates to a production method for a core-shell porous silica particle is provided, the method including: (a) preparing an aqueous solution containing a non-porous silica particle, a cationic surfactant, a basic catalyst, and an alcohol; (b) adding a silica source to the aqueous solution to form a shell precursor on a surface of the non-porous silica particle; (c) removing the cationic surfactant from the shell precursor and forming a porous shell; (d) preparing an aqueous solution containing the porous silica particle resulting from the shell formation, a cationic surfactant, a basic catalyst, and an alcohol; (e) adding a silica source to the aqueous solution to form a shell precursor on a surface of the porous silica particle; and (f) removing the cationic surfactant from the shell precursor and forming a porous shell; wherein the steps (d) to (f) are further repeated one to three times, in which case the "shell formation" in step (d) refers to the shell formation in step (f).

The production method according to the present disclosure includes the above-mentioned steps, but may include other steps.

<1. Step (a): Preparation Step>

The present disclosure includes a preparation step of preparing an aqueous solution containing a non-porous silica particle, a cationic surfactant, a basic catalyst, and an alcohol. The preparation step may include other steps. Here, the aqueous solution herein may be a liquid in which a substance is dissolved in water, or a liquid in which a substance is dispersed in water. That is, the water of the aqueous solution may be a solvent or a dispersing medium.

(Non-Porous Silica Particle)

The non-porous silica particle in this step is used as a core particle of a core-shell porous silica particle produced by the production method according to the present disclosure, and is substantially non-porous.

'Substantially non-porous' means that the core particle has a specific surface area of 50 $m^2/g$ or less as measured using a nitrogen gas adsorption method. By setting the specific surface area of the core particle to 50 $m^2/g$ or less, when the core-shell type silica is used as a filler for liquid chromatography, a substance to be separated, which is adsorbed by the shell, is not adsorbed by the core particle, and thereby the separation efficiency is increased. The specific surface area of the core particle is preferably 30 $m^2/g$ or less.

The non-porous silica particle in this step may be a commercially available product, or may be produced using, for example, the production method described in the examples of Patent Document 3.

In this step, the volume average particle size ($D_v$) of the non-porous silica particles is normally 20 nm or greater, preferably 30 nm or greater, and more preferably 40 nm or greater, from the perspective of ensuring dispersion stability of the non-porous silica particles in the reaction solution. On the other hand, from the perspective of reducing the volume fraction of the non-porous silica particles in the core-shell porous silica particles, the volume average particle size ($D_v$) of the non-porous silica particles is typically 1.5 µm or less, preferably 1.2 µm or less, and more preferably 1.0 µm or less.

Note that the volume average particle size ($D_v$) may be determined, for example, by randomly selecting approximately 100 particles from a particle image captured by an electron microscope and measuring the particle size thereof.

From the perspective of increasing the filling rate of core-shell porous silica particles that are ultimately produced, the particle size dispersity ($C_v$) of the non-porous silica particles in the present step is normally 15% or less, preferably 10% or less, and more preferably 8% or less. Also, the particle size dispersity ($C_v$) is typically greater than 0%.

Note that the particle size dispersity ($C_v$) may also be determined, for example, by randomly selecting approximately 100 particles from a particle image captured by an electron microscope and measuring the particle size thereof.

When the volume fraction of the non-porous silica particles prepared by this step relative to the reaction volume in the shell precursor formation step (b) is set to be greater than a certain value, almost the entire amount of the silica source is consumed in the formation of the shell, and therefore the production of new porous silica particle is suppressed. That is, when the volume fraction of the non-porous core particles relative to the reaction volume is too small, fine porous silica particles may be formed. Therefore, the volume fraction of the non-porous core particles relative to the reaction volume is usually 0.001 vol. % or greater, preferably 0.010 vol. % or greater, and more preferably 0.020 vol. % or greater. On the other hand, from the perspective of reducing the frequency of collision between the non-porous silica particles in the solution, the volume fraction of the non-porous core particles relative to the reaction volume is usually 50 vol. % or less, preferably 20 vol. % or less, and more preferably 10 vol. % or less.

(Method for Producing Non-Porous Silica Particle)

The method for producing the non-porous silica particle in the present step is not particularly limited. An example of the method includes the production method described in "Preparation Example 1 of core particles (non-porous silica particles)" in the examples of Patent Document 3. In this production method of the examples, a small sealed glass reactor with an internal volume of 110 ml was used, and stirring was performed using a magnetic stirrer to make the reaction solution be uniform.

(Cationic Surfactant)

The cationic surfactant in this step acts as a template for forming pores in the shell. The type and concentration of the cationic surfactant greatly affect the shape of the pores of the shell. In this step, one type of cationic surfactant may be used, or two or more types may be used in combination, but use of one type is preferred in order to form a shell having uniform pores.

The type of cationic surfactant in this step is not particularly limited as long as the desired effect of the present disclosure is achieved, but alkylammonium halides and alkylamines are preferable.

Examples of alkylammonium halides include tetradecyltrimethylammonium halides, hexadecyltrimethylammonium halides, octadecyltrimethylammonium halides, eicosyltrimethylammonium halides, and docosyltrimethylammonium halides. Of these, from the perspective of the size of the pores to be formed, hexadecyltrimethylammonium halides and octadecyltrimethylammonium halides are preferred, and hexadecyltrimethylammonium bromide (cetyltrimethylammonium bromide; CTAB) and octadecyltrimethylammonium bromide are more preferred.

Examples of the alkylamines include linear alkylamines having from 8 to 20 carbons, and dodecylamine is particularly preferable from the perspective of easily forming uniform pores.

The overall concentration of the cationic surfactant(s) is typically 0.1 mM or greater, preferably 1 mM or greater, and more preferably 5 mM or greater in order to sufficiently exhibit the effect as a template. On the other hand, in order to form uniform pores, the overall concentration of the cationic surfactant(s) is usually 1000 mM or less, preferably 500 mM or less, and more preferably 100 mM or less.

(Basic Catalyst)

In this step, the basic catalyst is not particularly limited, and inorganic and organic basic catalysts that can be used to produce a core-shell porous silica particle can be appropriately used. One type of basic catalyst may be used alone, or two or more types may be used in combination. Among these, ammonium-based or amine-based basic catalysts, which are nitrogen-based basic catalysts, are preferable, and highly reactive ammonia is more preferable. Furthermore, in cases where ammonia is used, the use of aqueous ammonia solution is preferable from the perspective of safety.

From the perspective of promoting the reaction, the overall concentration of the basic catalyst(s) is typically 0.01 mM or greater, preferably 0.05 mM or greater, more preferably 0.1 mM or greater, even more preferably 1 mM or greater, and particularly preferably 10 mM or greater. On the other hand, from the perspective of reaction control, the overall concentration of the basic catalyst(s) is typically 10 M or less, preferably 5 M or less, more preferably 3 M or less, even more preferably 500 mM or less, and particularly preferably 100 mM or less.

(Alcohol)

The alcohol in this step is at least one type selected from the group consisting of methanol, ethanol, isopropanol, n-propanol, ethylene glycol, and glycerin, and from the perspective of good solubility of the silica raw material, methanol and ethanol are preferable, and ethanol is more preferable.

The concentration of the alcohol is typically 0.1 M or greater, preferably 0.5 M or greater, and more preferably 1 M or greater. On the other hand, the concentration thereof is typically not greater than 18 M, preferably not greater than 17 M, and more preferably not greater than 15 M.

In cases where, for example, tetraethoxysilane is used as the silica source for producing porous silica, hydrolysis of the alkoxysilane can be controlled at a suitable rate and the porous silica can be formed uniformly on the surface of the silica core particle by setting the alcohol concentration to 0.1 M or greater. Also, when the alcohol concentration exceeds 18 M, production of porous silica with good efficiency is hindered.

(Other)

In this step, components in addition to those described above can be added to prepare the aqueous solution as long as the desired effect according to the present disclosure is achieved.

<2. Step (b): Shell Precursor Formation Step>

The present disclosure includes a shell precursor formation step in which a silica source is added to the aqueous solution prepared in the above-mentioned preparation step (a), and a shell precursor is formed on the surface of the non-porous silica particle. The shell precursor formation step may include other steps.

(Silica Source)

The silica source in this step may be any substance capable of forming a silicon oxide by reaction, and from the perspective of reaction efficiency and handling, an alkoxysilane, sodium silicate, and mixtures thereof are preferable, and an alkoxysilane is more preferable. From the perspective of versatility, of the alkoxysilanes, trimethylmethoxysilane, trimethylethoxysilane, tetraethoxysilane (tetraethylorthosilicate; TEOS), and tetramethoxysilane are more preferable, and tetraethoxysilane (tetraethylorthosilicate; TEOS) is particularly preferable.

The silica source in this step is added as a solution to the aqueous solution prepared in the preparation step (a). The silica source is preferably added as an alcohol solution described in the "(Alcohol)" section of the preparation step (a), but is not particularly limited thereto as long as the shell precursor can be formed on the surface of the non-porous silica particle.

The concentration of the silica source in this step is usually 0.1 mM or greater, preferably 0.5 mM or greater, and more preferably 1 mM or greater. On the other hand, the concentration thereof is ordinarily not greater than 200 mM, preferably not greater than 150 mM, and more preferably not greater than 100 mM.

The core particle can be sufficiently coated with the shell by setting the concentration of the silica source to 0.1 mM or greater. On the other hand, when the concentration of the silica source is set to 200 mM or less, substantially the entire amount of the silica source is consumed in the formation of the shell, and the production of new silica particle is suppressed.

(Shell Precursor Formation)

Silica is precipitated on the surface of the non-porous core particle at a nearly uniform thickness as a result of the reaction of the aqueous solution prepared in the preparation step (a) with the silica source that has been added. Here, micelles of the cationic surfactant are incorporated into the silica, thereby forming a shell precursor containing silica and the cationic surfactant.

(pH)

The pH when the shell precursor is formed is typically 8 or higher, preferably 8.5 or higher, and more preferably 9 or higher. Furthermore, the pH thereof is generally 13 or lower, preferably 12.5 or lower, and more preferably 12 or lower.

A pH of less than 8 is not desirable because the hydrolysis rate of the silica source is slow. On the other hand, when the pH exceeds 13, the hydrolysis rate of the silica source cannot be controlled, which is not preferable.

Examples of methods for adjusting the pH include a method of adding a basic compound, and an example thereof is a method in which a basic surfactant, for example, an alkylamine, is added as a surfactant.

(Temperature)

From the perspective of the reaction rate, the temperature at which the shell precursor is formed is typically 5° C. or higher, preferably 10° C. or higher, and more preferably 15° C. or higher. On the other hand, from the perspectives of reaction controllability and boiling point of the solvent, the temperature is typically not higher than 80° C., preferably not higher than 70° C., and more preferably not higher than 60° C.

(Time)

From the perspective of uniformity of the shell precursor that is formed, the time taken for shell precursor formation is usually 30 minutes or longer, preferably 1 hour or longer, and more preferably 2 hours or longer. Meanwhile, from the perspective of efficient shell precursor formation, the time taken for shell precursor formation is usually 48 hours or less, preferably 36 hours or less, and more preferably 24 hours or less.

<3. Step (c): Shell Formation Step>

The present disclosure includes a shell formation step in which the cationic surfactant is removed from the shell precursor formed in the above-mentioned shell precursor formation step (b), and a porous shell is formed. The shell formation step may include other steps.

Examples of methods that can be used to remove the cationic surfactant from the shell precursor formed in the shell precursor formation step (b) include a method of adding the shell precursor into a solvent in which the cationic surfactant dissolves and eluting the cationic surfactant into the solvent, and a method of firing the shell precursor formed in the shell precursor formation step (b) to thereby burn off the cationic surfactant in the shell precursor. Both of these methods are preferred methods, and it is more preferable to use the two methods in combination in order to completely remove the cationic surfactant.

With the latter firing method, the firing temperature is ordinarily at least 300° C., preferably at least 350° C., and more preferably at least 400° C., from the perspective of sufficient removal of the cationic surfactant. Meanwhile, from the perspective of maintaining the porous structure, the firing temperature is ordinarily not higher than 1000° C., preferably not higher than 900° C., and more preferably not higher than 800° C.

Furthermore, from the perspective of sufficient removal of the cationic surfactant, the firing time is ordinarily 30 minutes or longer, preferably 1 hour or longer, and more preferably 2 hours or longer. Meanwhile, from the perspective of efficient removal thereof, the firing time is ordinarily not longer than 24 hours, preferably not longer than 12 hours, and more preferably not longer than 6 hours.

In addition to the step in which the cationic surfactant is removed from the shell precursor formed in the shell precursor formation step (b) and a porous shell is formed, the shell formation step (c) may include, for example, a washing step in which the shell precursor formed in the shell precursor formation step (b) is washed, and a drying step in which the shell precursor is dried. The preferred order of these steps is formation of the shell precursor, and then the washing step, the drying step, and removal of the cationic surfactant.

(Washing Step)

In the washing step, washing can be carried out by, for example, precipitating the shell precursor through centrifugal separation, and replacing the solution. Water, and particularly deionized water (ultrapure water) is preferably used for washing, and washing is generally carried out three times.

(Drying Step)

In the drying step, drying can be carried out by, for example, leaving the shell precursor to stand overnight under a vacuum condition at room temperature after the reaction solution has been removed by centrifugation.

<4. Step (d): Preparation Step>

The present disclosure includes a preparation step of preparing an aqueous solution containing the porous silica particle resulting from the above-mentioned shell formation step (c), a cationic surfactant, a basic catalyst, and an alcohol. The preparation step may include other steps. Note that, in this case, even if the particle includes the non-porous silica particle as the core particle, the particle will be referred to as "porous silica particle" as long as it has a porous shell.

The description of step (a) is incorporated in the description of this step, except those in the sections of "Non-porous Silica Particles" and "Method for Producing Non-porous Silica Particles".

In this step, the volume average particle size (DO of the porous silica particles is normally 20 nm or greater, preferably 30 nm or greater, and more preferably 40 nm or greater, from the perspective of ensuring dispersion stability of the porous silica particles in the reaction solution. On the other hand, from the perspective of reducing the volume fraction of the porous silica particles in the core-shell porous silica particles, the volume average particle size ($D_v$) of the porous silica particles is typically 1.5 μm or less, preferably 1.2 μm or less, and more preferably 1.0 μm or less.

Note that the volume average particle size ($D_v$) may be determined, for example, by randomly selecting approximately 100 particles from a particle image captured by an electron microscope and measuring the particle size thereof.

From the perspective of increasing the filling rate of core-shell porous silica particles that are ultimately produced, the particle size dispersity ($C_v$) of the porous silica particles in the present step is normally 15% or less, preferably 10% or less, and more preferably 8% or less. Also, the particle size dispersity ($C_v$) is typically greater than 0%.

Note that the particle size dispersity ($C_v$) may also be determined, for example, by randomly selecting approximately 100 particles from a particle image captured by an electron microscope and measuring the particle size thereof.

When the volume fraction of the porous silica particles prepared by this step relative to the reaction volume in the shell precursor formation step (e) is set to be greater than a certain value, almost the entire amount of the silica source is consumed in the formation of the shell, and therefore the production of new porous silica particles is suppressed. That is, when the volume fraction of the porous silica particles relative to the reaction volume is too small, fine porous silica particles may be formed. Therefore, the volume fraction of the porous silica particles relative to the reaction volume is usually 0.001 vol. % or greater, preferably 0.010 vol. % or greater, and more preferably 0.020 vol. % or greater. On the other hand, from the perspective of reducing the frequency of collision between the porous silica particles in the solution, the volume fraction of the porous silica particles relative to the reaction volume is usually 50 vol. % or less, preferably 20 vol. % or less, and more preferably 10 vol. % or less.

<5. Step (e): Shell Precursor Formation Step>

The present disclosure includes a shell precursor formation step in which a silica source is added to the aqueous solution prepared in the above-mentioned preparation step (d), and a shell precursor is formed on the surface of the porous silica particle. The shell precursor formation step may include other steps.

The description of step (b) is incorporated in the description of this step. However, the phrase "non-porous silica particle" in the description of step (b) is replaced with "porous silica particle". In addition, "preparation step (a)" in the description of step (b) is replaced with "preparation step (d)".

<6. Step (f): Shell Formation Step>

The present disclosure includes a shell formation step in which the cationic surfactant is removed from the shell precursor formed in the above-mentioned shell precursor formation step (e), and a porous shell is formed. The shell formation step may include other steps.

The description of step (c) is incorporated in the description of this step. However, "shell precursor formation step (b)" is replaced with "shell precursor formation step (e)".

(Number of Repetitions)

In the present disclosure, the aforementioned steps (d) to (f) are repeated one or more times (i.e. performed two or more times in total). In this case, the "shell formation step" in step (d) refers to step (f).

For increasing the thickness of the shell, it is advantageous to perform shell formation multiple times on the core particle. However, the more times shell formation is performed, the shell formed may be more prone to disintegration, or changes in the pore structure may be more likely to occur, resulting in failure to form the desired pore structure. Furthermore, a large number of repetitions may translate to longer production time, more complicated operation, and higher production costs. Therefore, as long as the method produces the core-shell porous silica particle having a shell which has a sufficiently increased thickness and a desired pore structure, and thus does not easily disintegrate, and preferably, as long as the method produces the particle easily at a low cost in a short time, the number of repeating steps (d) to (f) is not limited, but is preferably three or fewer times (i.e., four or fewer times performed in total), more preferably two or fewer times (i.e., three or fewer times performed in total), and even more preferably one time (i.e., two times performed in total).

<7. Core-Shell Porous Silica Particle>

A core-shell porous silica particle is produced by the production method according to the present disclosure.

From the perspective of operability such as column pressure loss when the core-shell porous silica particles are used as a chromatography filler, the volume average particle size ($D_v$) of the core-shell porous silica particles produced by the production method according to the present disclosure is ordinarily at least 30 nm, preferably at least 650 nm, and more preferably at least 750 nm. On the other hand, from the perspective of column performance such as column efficiency when the core-shell porous silica particles are used as a chromatography filler, the volume average particle size ($D_v$) of the core-shell porous silica particles is ordinarily 50 µm or less, preferably 20 µm or less, and more preferably 10 µm or less.

The volume average particle size ($D_v$) may be determined, for example, by randomly selecting approximately 100 particles from a particle image captured by an electron microscope and measuring the particle size thereof.

For the good filling properties in a chromatography column, the particle size dispersity ($C_v$) of the core-shell porous silica particles produced by the production method according to the present disclosure is usually not greater than 10%, preferably not greater than 3.5%, more preferably not greater than 3%, and even more preferably not greater than 2.5%. Also, the particle size dispersity ($C_v$) is typically greater than 0%.

The particle size dispersity ($C_v$) may be determined, for example, by randomly selecting approximately 100 particles from a particle image captured by an electron microscope and measuring the particle size thereof.

The shell thickness ($T_s$) of the core-shell porous silica particle produced by the production method according to the present disclosure is not limited, but is, from the perspective of high porosity, usually not less than 10 nm, preferably not less than 90 nm, and more preferably not less than 150 nm. On the other hand, from the perspective of mechanical strength of the particle, the shell thickness ($T_s$), while not limited, is usually not greater than 500 nm, and in order of increasing preference, is not greater than 400 nm, not greater than 300 nm, and not greater than 200 nm.

The shell thickness ($T_s$) may be determined, for example, by calculating the difference in the volume average particle size ($D_v$) between the core-shell porous silica particle produced by the production method according to the present disclosure and the core particle.

Furthermore, as described so far, the core-shell porous silica particle produced by the production method according to the present disclosure is produced by performing from the preparation step (a) through the shell formation step (c) and then from the preparation step (d) through the shell formation step (f). As in the example described below, the shell thickness ($T_s$) of the particle produced this way is significantly greater than of those produced without having performing the steps from the preparation step (d) through the shell formation step (f).

The specific surface area ($S_{BET}$) of the core-shell porous silica particle produced by a production method according to the present disclosure is not limited, but is, from the perspective of ensuring sufficient permeability of the substances to be separated, usually 20 $m^2/g$ or greater, preferably 360 $m^2/g$ or greater, and more preferably 500 $m^2/g$ or greater. On the other hand, from the perspective of operability such as the elution time of the substances to be separated when the core-shell porous silica particle is used as a chromatography filler, the specific surface area ($S_{BET}$) is, while not limited, typically not greater than 3000 $m^2/g$, preferably not greater than 2000 $m^2/g$, and more preferably not greater than 1500 $m^2/g$. The specific surface area ($S_{BET}$) may be determined, for example, by calculating the nitrogen adsorption/desorption isotherm through BET analysis.

The pore volume ($V_p$) of the core-shell porous silica particle produced by the production method according to the present disclosure is not limited, but is, from the perspective of ensuring sufficient permeability of the substances to be separated, usually 0.05 $cm^3/g$ or greater, preferably 0.280 $cm^3/g$ or greater, and more preferably 0.350 $cm^3/g$ or greater. On the other hand, from the perspective of operability such as the elution time of the substances to be separated when the core-shell porous silica particle is used as a chromatography filler, the pore volume ($V_p$), while not limited, is usually 5 $cm^3/g$ or less, preferably 3 $cm^3/g$ or less, and more preferably 2 $cm^3/g$ or less. The pore volume ($V_p$) may be determined, for example, by converting the amount of adsorption when the ratio of the vapor pressure to the saturated vapor pressure is 0.99.

When the core-shell porous silica particles are actually used as a liquid chromatography filler or the like, they function as an adsorption layer, and therefore the peak pore size ($D_p$) of the core-shell porous silica particles produced by the production method according to the present disclosure is ordinarily 1 nm or greater, preferably 2 nm or greater, and more preferably 2.3 nm or greater. On the other hand, since the core-shell porous silica particles can be used to separate organic substances and proteins by molecular size, the peak pore size ($D_p$) of the core-shell porous silica particles produced by the production method according to the present disclosure is typically not greater than 10 nm, preferably not greater than 5 nm, more preferably not greater than 3 nm, and more preferably not greater than 2.5 nm. The peak pore size ($D_p$) may be determined by, for example, the nitrogen adsorption/desorption isotherm by BJH analysis.

EXAMPLES

The present disclosure is described in further detail below through specific examples; however, the examples are by no means intended to limit the present disclosure.

Example 1

(Raw Materials for Core-Shell Porous Silica Particles)

Core particle: non-porous silica particle (spherical silica, available from Sakai Chemical Industry Co., Ltd.) ($D_v$=451 nm, $C_v$=4.7%)

Cationic surfactant: hexadecyltrimethylammonium halide (cetyltrimethylammonium bromide; CTAB) (guaranteed reagent, purity of 98.0%, available from Wako Pure Chemical Industries, Ltd.)

Basic catalyst: aqueous ammonia solution (guaranteed reagent, 25 wt. %, available from Wako Pure Chemical Industries Co., Ltd.)

Alcohol: ethanol (guaranteed reagent, 99.5%, available from Wako Pure Chemical Industries, Ltd.)

Silica source: tetraethoxysilane (tetraethylorthosilicate; TEOS) (guaranteed reagent, purity of 95.0%, available from Wako Pure Chemical Industries, Ltd.)

Deionized water: deionized water produced by ion removal and microparticle filtration using an ultrapure water producing device (Merck & Co., Inc.); electrical resistance of 18.2 MΩ·cm (Manufacturing Method)

A screw tube bottle was used as the reactor, and a magnetic stirrer was used for stirring.

Stage One: The non-porous silica particles, which were the core particles, and the cationic surfactant CTAB were dispersed ultrasonically in the deionized water for 30 minutes. Subsequently, ethanol was added as an alcohol, and an aqueous ammonia solution was added as a basic catalyst. The mixture was stirred for 30 minutes, and TEOS was added as a silica source to thereby initiate a hydrolysis/condensation reaction. The reaction was carried out at 35° C. for 18 hours. After completion of the reaction, the formed particles were collected by centrifugation, and vacuum dried overnight at 60° C. to remove the moisture. Next, the particles were fired for 4 hours at 550° C. in the atmosphere to thereby remove the cationic surfactant, which was a template for the pores, and porous silica particles were produced.

Stage Two: The porous silica particles produced in Stage One and the cationic surfactant CTAB were dispersed ultrasonically in the deionized water for 30 minutes. Thereafter, the same operations as described in Stage One were repeated once to produce core-shell porous silica particles.

Note that in both Stage One and the Stage Two, the reagents were as follows: 60 mM of TEOS, 20 mM of CTAB, 10 mM of the aqueous ammonia solution, 5 M of the ethanol, 38 M of the deionized water, and 0.42 (v/v) of the ethanol/deionized water. Furthermore, the core particles (non-porous silica particles) were 0.40 vol %, and the reaction volume was 300 ml.

(Evaluation Methods)

Observation of Core-Shell Porous Silica Particles

A scanning transmission electron microscope (FE-STEM, available from Hitachi, Ltd., HD-2700) was used to observe the particle form. As the sample for TEM observations, a sample was made by dripping a suspension of the product onto a collodion film-attached mesh (200 mesh, available from JEOL, Ltd.) and drying the suspension naturally.

Calculation of BET Specific Surface Area ($S_{BET}$) and Peak Pore Size ($D_p$)

The nitrogen adsorption/desorption isotherms of the particles were measured using an automatic specific surface area/pore size distribution measurement device (BELSORP-mini II, available from MicrotracBEL Corp.). A Pyrex standard sample tube was used as a sample tube, and a BELPREP-vac II was used for pre-treatment. The core-shell porous silica particles produced were used as the measurement sample, and the sample was subjected to a pre-treatment at 300° C. for 3 hours under vacuum, after which measurements were started. The BET specific surface area ($S_{BET}$), pore size distribution (BJH method), and peak pore size ($D_p$) were calculated using BEL Master as the analysis software.

Calculation of Volume Average Particle Size ($D_v$), Particle Size Dispersity ($C_v$), and Shell Thickness ($T_s$)

To calculate the particle size distribution, the particle sizes were measured directly from a TEM image using calipers (available from Mitutoyo Corporation). For each sample, the particle sizes of approximately 100 particles were measured, and the volume average particle size $d_v$ (synonymous with the $D_v$ above) was calculated from the following definitional equation (1), the standard deviation σ was calculated from the following definitional equation (2), and the particle size dispersity $C_v$ was calculated from the following definitional equation (3). Note that in the equations, $d_i$ denotes the particle size and $n_i$ denotes the number of particles. In addition, the shell thickness ($T_s$) was calculated from the difference in the $D_v$ between the core-shell porous silica particles produced and the core particles.

[Equation 1]

$$d_v = \left( \sum_i n_i d_i^3 \bigg/ \sum_i n_i \right)^{1/3} \quad (1)$$

[Equation 2]

$$\sigma = \left[ \sum_i \left\{ d_i - \left( \sum_i n_i d_i \bigg/ \sum_i n_i \right) \right\}^2 \right]^{1/2} \quad (2)$$

[Equation 3]

$$Cv = \frac{\sigma}{\sum_i n_i d_i \bigg/ \sum_i n_i} \times 100 \quad (3)$$

Calculation of Pore Volume $V_p$

The pore volume ($V_p$) was determined by converting the amount of adsorption when the ratio of the vapor pressure to the saturated vapor pressure was 0.99.

Comparative Example 1

The same procedures as in Example 1 were performed except that the procedures in Stage Two were not performed.
(Results)

A STEM image of particles obtained in Example 1 is shown in FIG. 1(a), and a STEM image of particles obtained in Comparative Example 1 is shown in FIG. 1(b). In addition, the results of evaluation by the above evaluation methods are shown in Table 1 below.

Figure 2:
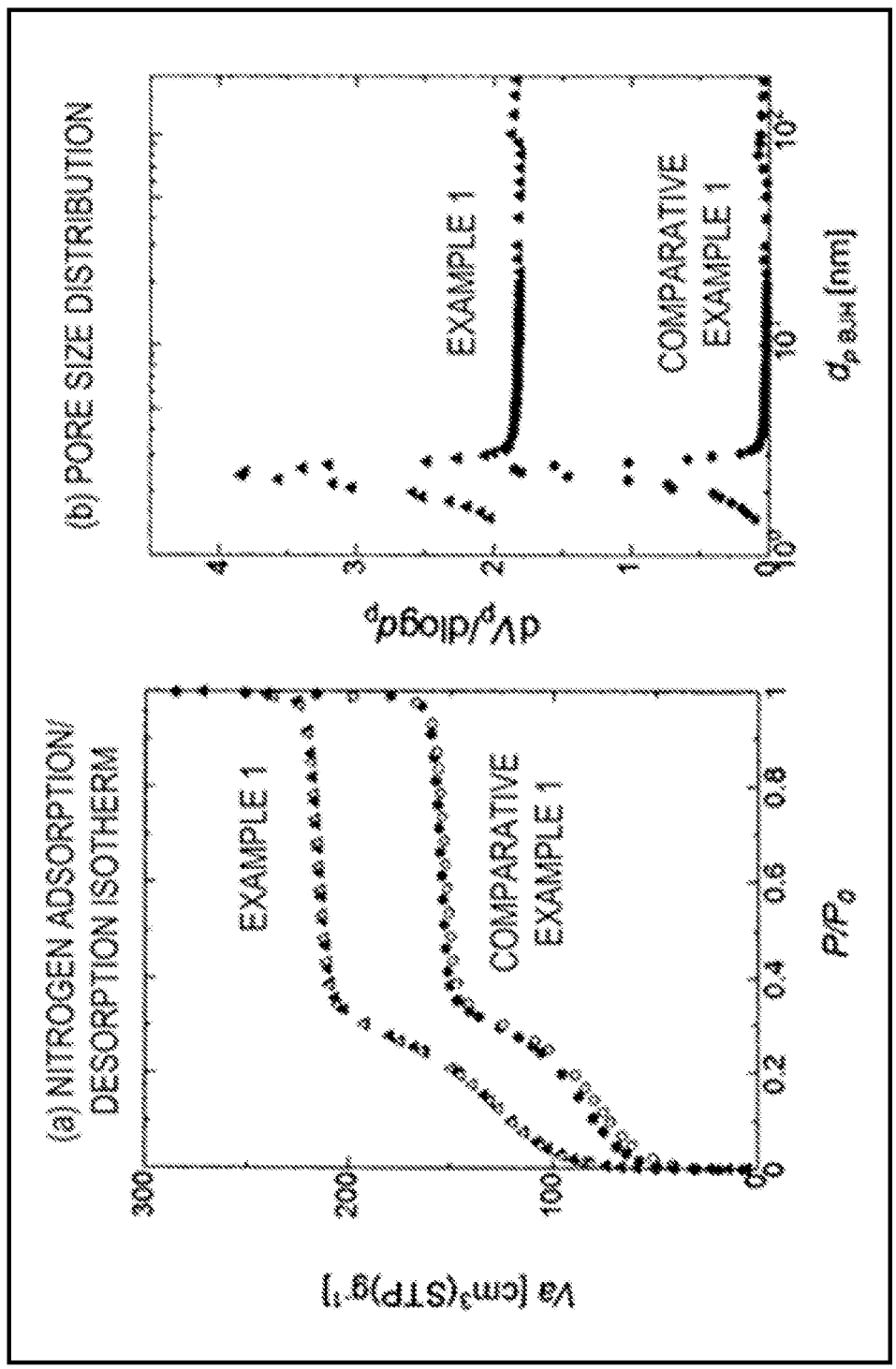
FIG. 2(a) is a diagram showing nitrogen adsorption/desorption isotherms obtained in Example 1 and Comparative Example 1, while (b) is a diagram showing pore size distributions obtained in Example 1 and Comparative Example 1.

Furthermore, nitrogen adsorption/desorption isotherms and pore size distributions are shown in FIG. 2(a) and FIG. 2(b), respectively. Note that in FIG. 2(a) and FIG. 2(b), results of Example 1 are plotted in triangles, while results of Comparative Example 1 are plotted in circles. Furthermore, in FIG. 2(a), results of the experiment at the time of adsorption in Example 1 and Comparative Example 1 are plotted in filled symbols, while results of the experiment at the time of desorption in Example 1 and Comparative Example 1 are plotted in unfilled symbols.

TABLE 1

Produced Core-Shell Porous Silica Particles

| | Volume Average Particle Size $D_v$ (nm) | Particle Size Dispersity $C_v$ (%) | Shell Thickness $T_s$ (nm) | Specific Surface Area $S_{BET}$ (m²/g) | Pore Volume $V_p$ (cm³/g) | Peak Pore Size $D_p$ (nm) | FIG. No. |
|---|---|---|---|---|---|---|---|
| Example 1 | 845 | 2.4 | 197 | 556 | 0.365 | 2.4 | FIG. 1(a) |
| Comparative Example 1 | 621 | 3.8 | 85 | 354 | 0.275 | 2.6 | FIG. 1(b) |

The shell thickness ($T_s$) was 197 nm in Example 1, which was approximately twice than the value of 85 nm in Comparative Example 1. Here, the volume average particle size ($D_v$) of the core-shell porous silica particles produced was 1.87 times that of the core particles in Example 1; this ratio was greater than that (1.6 times) of commercially available particles (Halo [trade name], having a volume average particle size ($D_v$) of 2700 nm, a core particle size of 1700 nm, and a shell thickness of 500 nm). There was no significant difference in pore size ($D_r$) between Example 1 and Comparative Example 1. Meanwhile, the BET specific surface area ($S_{BET}$) and the pore volume ($V_p$) of Example 1 were significantly greater than that of Comparative Example 1.

As described above, with the production method according to the present disclosure, core-shell porous silica particles having a shell whose thickness is significantly increased compared to those made using conventional methods can be produced.

INDUSTRIAL APPLICABILITY

The production method according to the present disclosure can be applied, for example, as a method for producing core-shell porous silica particles that are used in a drug delivery system (DDS) or in a filler for a liquid chromatography column.

The invention claimed is:

1. A production method for a core-shell porous silica particle, the method comprising:
   (a) preparing an aqueous solution containing a non-porous silica particle, a cationic surfactant, a basic catalyst, and an alcohol;
   (b) adding a silica source to the aqueous solution to form a shell precursor on a surface of the non-porous silica particle;
   (c) removing the cationic surfactant from the shell precursor and forming a porous shell;
   (d) preparing an aqueous solution containing a porous silica particle resulting from the forming the porous shell, a cationic surfactant, a basic catalyst, and an alcohol;
   (e) adding a silica source to the aqueous solution to form a shell precursor on a surface of the porous silica particle; and
   (f) removing the cationic surfactant from the shell precursor and forming a porous shell; wherein
   the steps (d) to (f) are further repeated one to three times, in which case the "forming the porous shell" in step (d) refers to the "forming a porous shell" in step (f).

2. The production method according to claim 1, wherein the cationic surfactant is at least one selected from the group consisting of a hexadecyltrimethylammonium halide and an octadecyltrimethylammonium halide.

3. The production method according to claim 1, wherein the basic catalyst is ammonia.

4. The production method according to claim 1, wherein the alcohol is ethanol.

5. The production method according to claim 1, wherein the silica source is tetraethoxysilane.

6. The production method according to claim 1, wherein:
   the cationic surfactant is a hexadecyltrimethylammonium halide;
   the basic catalyst is ammonia;
   the alcohol is ethanol; and
   the silica source is tetraethoxysilane.

7. The production method according to claim 6, wherein the steps (d) to (f) are repeated one time.

* * * * *